United States Patent
Malone et al.

(10) Patent No.: US 8,694,225 B2
(45) Date of Patent: Apr. 8, 2014

(54) UTILIZATION OF VEHICLE PRESENCE SYSTEMS FOR POWERTRAIN RESPONSE READINESS AND CONSERVING ENERGY

(75) Inventors: Mark Douglas Malone, Canton, MI (US); William Najib Mansur, West Bloomfield, MI (US); Tuan Anh Be, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 34 days.

(21) Appl. No.: 13/607,318

(22) Filed: Sep. 7, 2012

(65) Prior Publication Data

US 2014/0074330 A1    Mar. 13, 2014

(51) Int. Cl.
*G08G 7/02*          (2006.01)
(52) U.S. Cl.
USPC ................... 701/96; 701/36; 701/70; 701/65; 701/93; 701/99; 180/271; 180/274; 180/282

(58) Field of Classification Search
None
See application file for complete search history.

(56) References Cited

U.S. PATENT DOCUMENTS

| | | | |
|---|---|---|---|
| 6,587,759 | B2 | 7/2003 | Obradovich et al. |
| 8,046,501 | B2 | 10/2011 | Gormley |
| 2002/0121969 | A1 | 9/2002 | Joao |
| 2010/0070171 | A1 | 3/2010 | Barbeau et al. |

*Primary Examiner* — Thomas Tarcza
*Assistant Examiner* — Richard Goldman
(74) *Attorney, Agent, or Firm* — Julia Voutyras; Alleman Hall McCoy Russell & Tuttle LLP

(57) ABSTRACT

A method and system relates to improving powertrain responsiveness in a vehicle while maintaining fuel economy by inhibiting entry into, or exiting, energy-saving modes when oncoming traffic is detected. In one example, the energy-saving mode is inhibited in response to an indication of an oncoming vehicle of concern. In a second example, the energy-saving mode is selectively maintained in response to an indication of an absence of oncoming traffic.

20 Claims, 8 Drawing Sheets

FIG. 8

Vehicle response to oncoming traffic scenarios

| Classification of approaching vehicle | Lane occupied by approaching vehicle | Responsive action of vehicle |
|---|---|---|
| Oncoming | Same Lane | Exit energy-saving mode in response to oncoming vehicle within second threshold distance, $d_{TH2}$, or within $d_{TH2}$ after threshold time, $t_{TH}$. |
| Oncoming | Adjacent Lane | Exit energy-saving mode in response to oncoming vehicle within third threshold distance, $d_{TH3}$. |
| Cross-traffic | Any lane | Exit energy-saving mode when oncoming vehicle is within fourth threshold distance, $d_{TH4}$. |
| Passing traffic | Any lane | Approaching vehicles are is greater than a first threshold distance, $d_{TH1}$, away. Selectively remain in energy-saving mode. |

US 8,694,225 B2

UTILIZATION OF VEHICLE PRESENCE SYSTEMS FOR POWERTRAIN RESPONSE READINESS AND CONSERVING ENERGY

FIELD

The present description relates to improving powertrain responsiveness in a vehicle by exiting energy-saving modes in response to detection of oncoming traffic. In one example, the energy-saving mode is inhibited in response to detecting an oncoming vehicle. The approach may be particularly useful to operate the vehicle in a responsive manner providing operator satisfaction while conserving energy.

BACKGROUND/SUMMARY

Automotive manufacturers have included systems in their vehicles to alert the driver to the presence of oncoming traffic. For example, the Cross-Traffic Alert system provides an indication of vehicles approaching perpendicular to the operator's vehicle. Such systems are typically intended to avoid collisions, particularly those involving oncoming vehicles in a driver's blind spots, where oncoming vehicles would not otherwise be readily identified by a vehicle operator who might be engaged with maneuvering activities that restrict operator assessment in the presence of reduced visibility or mobility.

The inventor herein has recognized potential issues with the above approaches. Namely, current collision-avoidance systems providing indication of oncoming vehicles may be offered alongside other vehicle features intended to conserve fuel, modify vehicle performance or handling, or other systems that trade powertrain response or powertrain readiness for saving energy. In particular, these other features may direct vehicle operation and operator focus to actions other than those optimally supportive to responding to oncoming vehicle traffic, including both oncoming traffic traveling in lanes parallel (e.g., oncoming parallel traffic) to the vehicle and in lanes perpendicular to the vehicle (e.g., oncoming cross-traffic). As such the readiness response of the vehicle and operator to oncoming vehicles, specifically the vehicle responsiveness to the operator, the vehicle driveability, and ultimately the operator satisfaction, may be diminished.

One approach that addresses the aforementioned issues is a method that may inhibit entry to the energy-saving mode or other vehicle system during a condition when an oncoming vehicle is detected. Furthermore, the method may selectively remain in the energy-saving mode in the absence of an oncoming vehicle, and exit the energy-saving mode in the presence of an oncoming vehicle. Thereby, vehicle responsiveness to the operator, the vehicle driveability, and operator satisfaction can be potentially improved as compared to if the vehicle remained in energy-saving mode.

The above advantages as well as other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 8 illustrates a table of example scenarios of oncoming traffic and conditions in which a vehicle may, responsive to the oncoming traffic condition, exit or remain in energy-saving mode.

DETAILED DESCRIPTION

Figure 1:
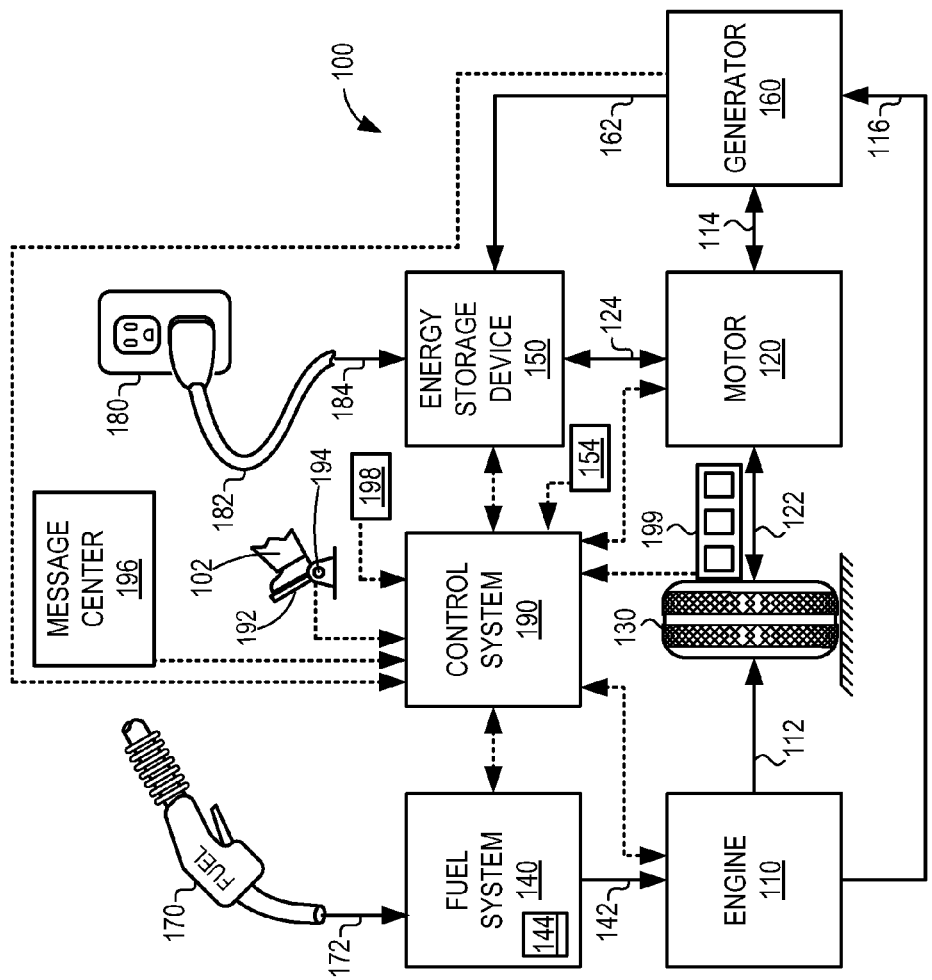
FIG. 1 shows a schematic of a propulsion system for a vehicle, including an engine, energy storage device, fuel system, and motor.
Figure 2:
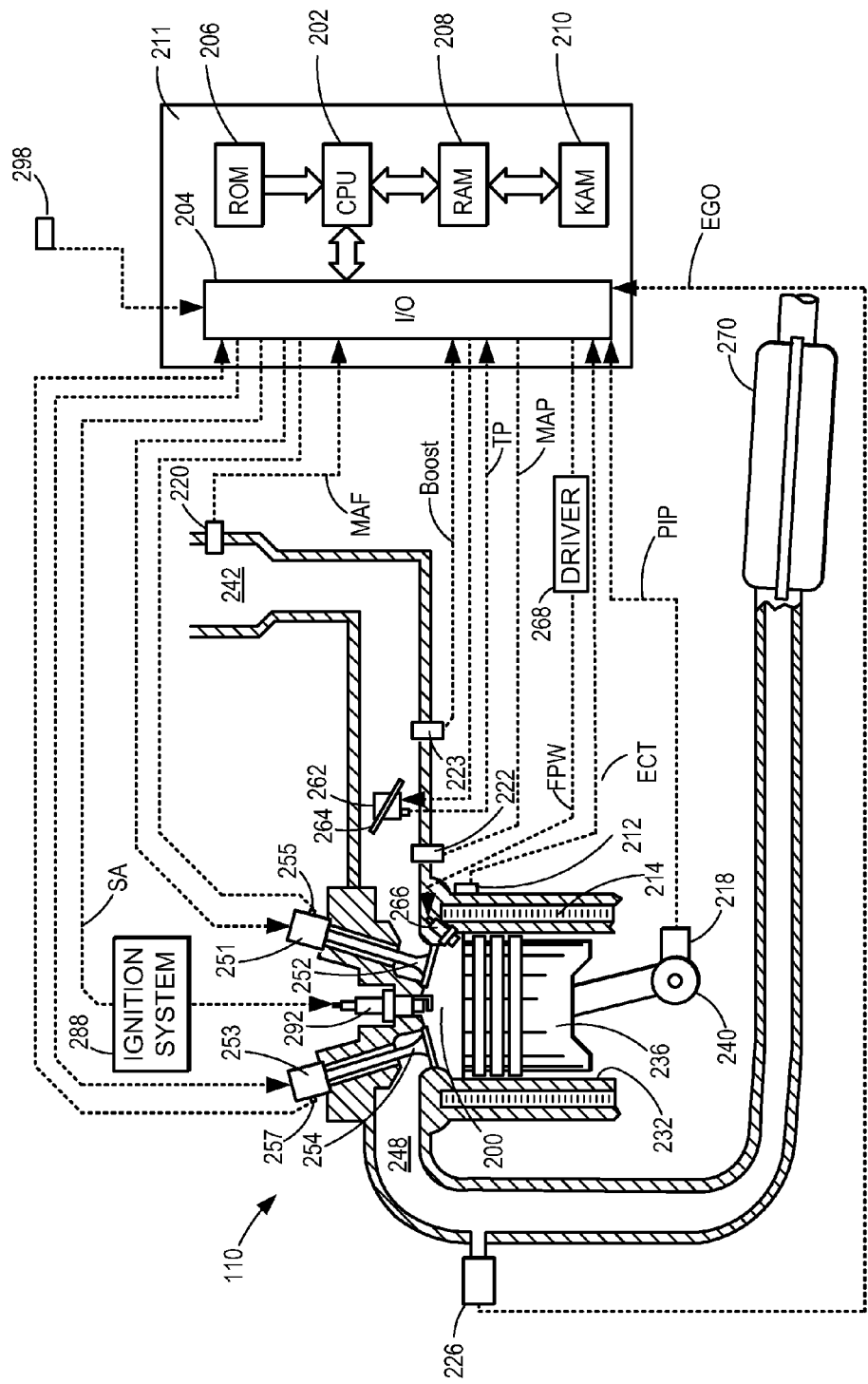
FIG. 2 shows a schematic of an engine, including a grid heater, exhaust-gas aftertreatment device, and exhaust-gas recycle.
Figure 3:
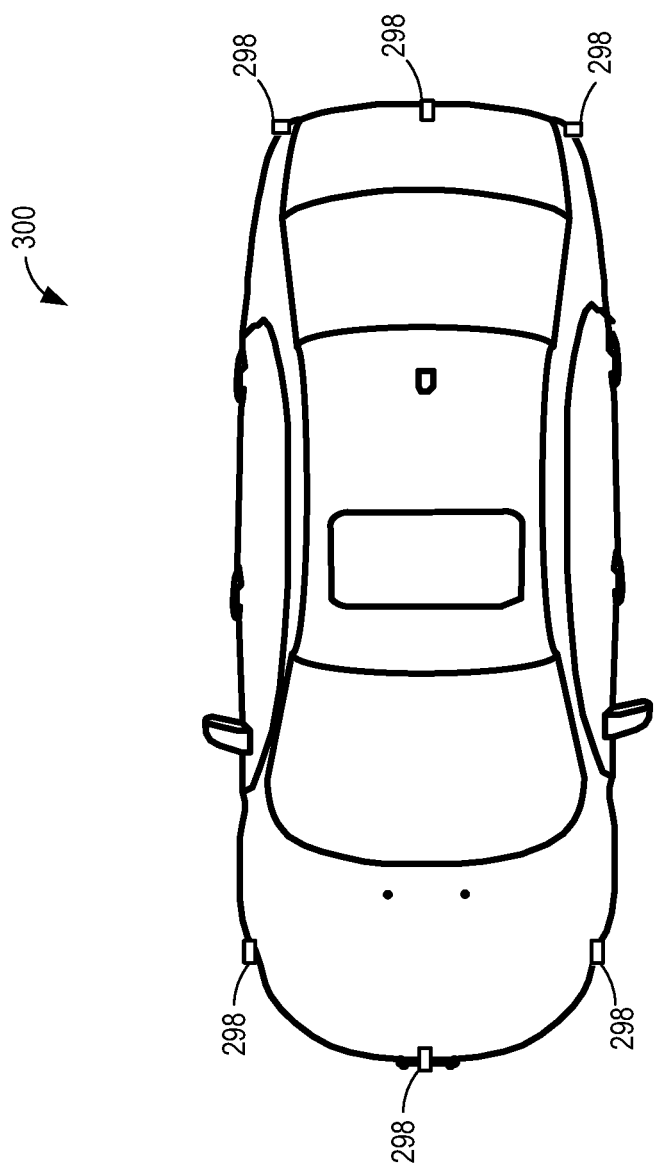
FIG. 3 illustrates a top-view of a vehicle, including positions of vehicle presence sensors.
Figure 4:
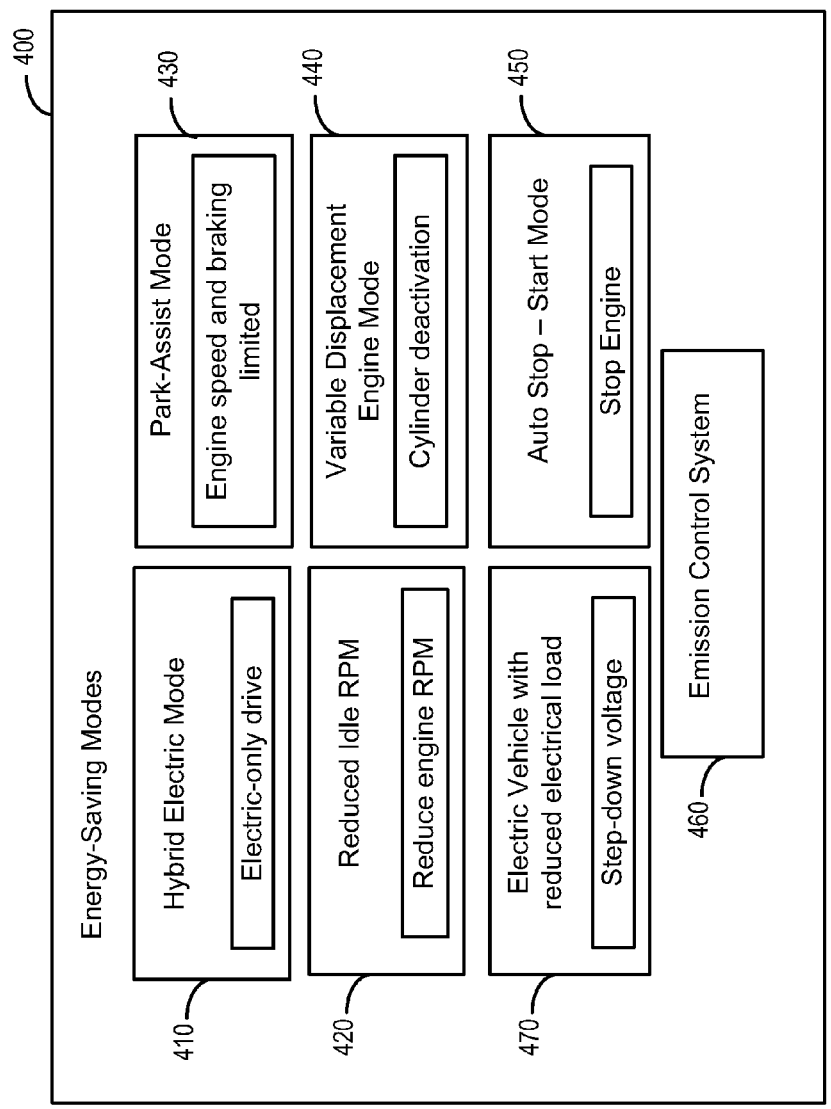
FIG. 4 illustrates common examples of energy-saving modes in a vehicle.
Figure 5:
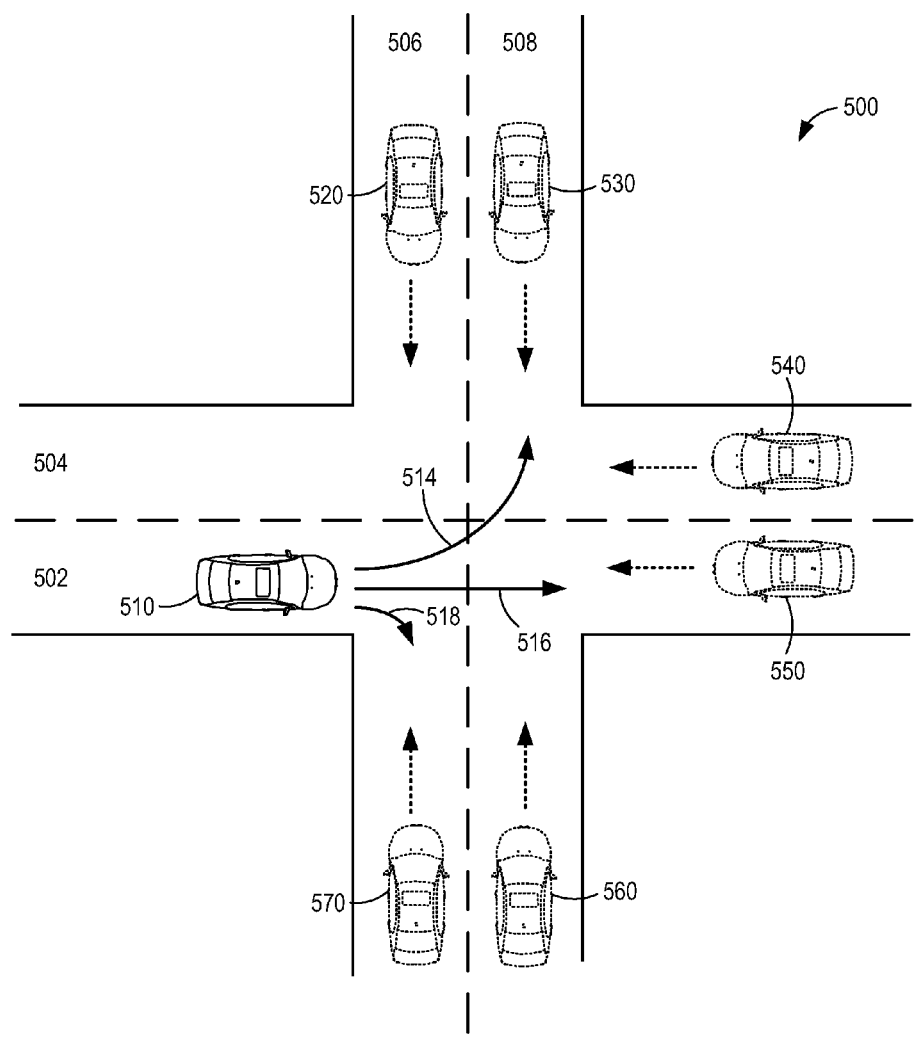
FIG. 5 illustrates example scenarios of oncoming traffic at a 4-way intersection.
Figure 6:
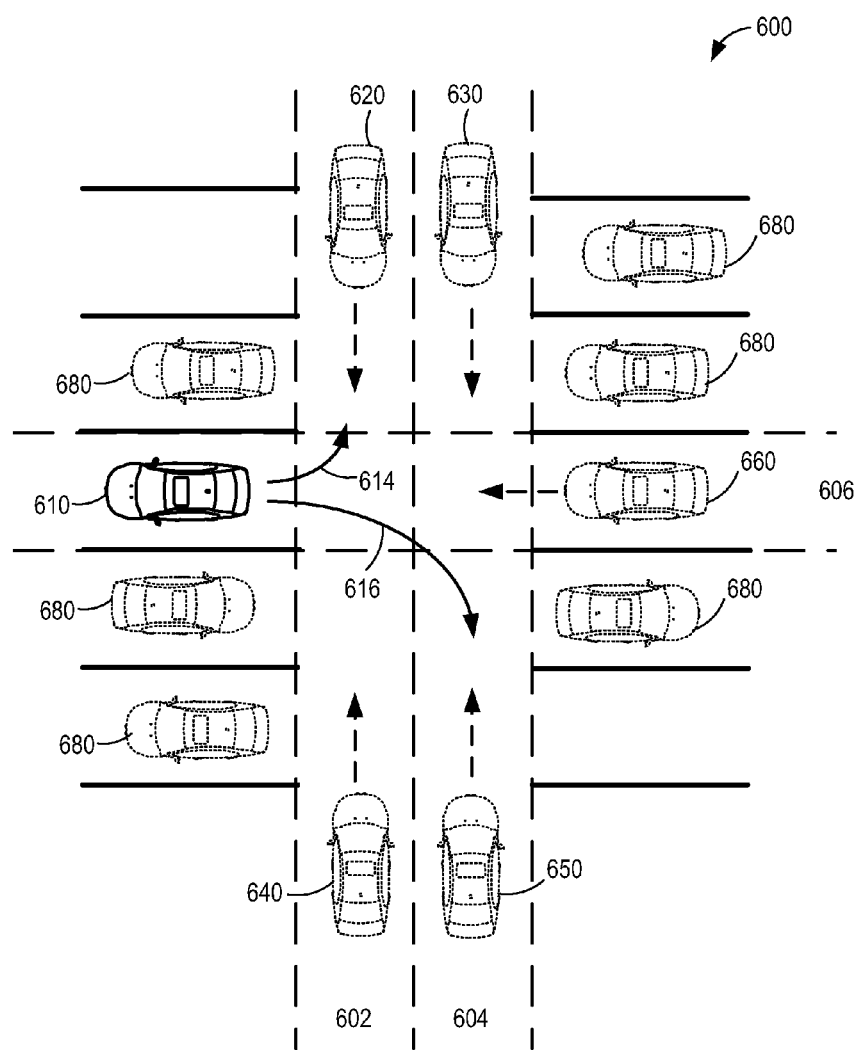
FIG. 6 illustrates example scenarios of oncoming traffic for a vehicle exiting a parking spot in a parking lot.
Figure 7:
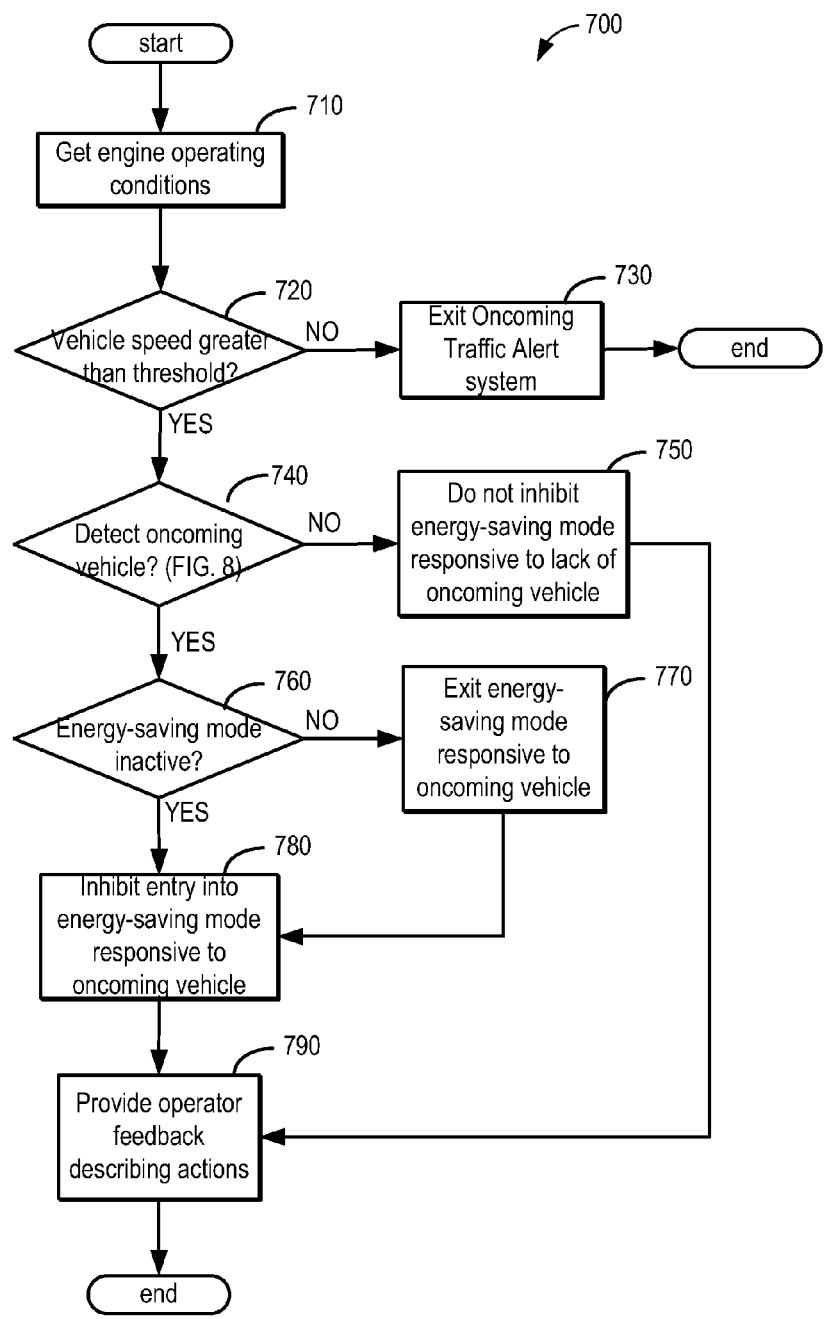
FIG. 7 shows a flow chart illustrating a method for operating an energy-saving mode in response to detecting oncoming traffic in a vehicle.

The present description is a method and system that provides rapid vehicle powertrain responsiveness when the presence of oncoming traffic is detected by a vehicle operating in an energy-saving mode. Oncoming traffic may include oncoming vehicles traveling in lanes at trajectories parallel or perpendicular (e.g., cross-traffic) to the lane in which the vehicle is traveling. Oncoming traffic may further include oncoming vehicles traveling in lanes at trajectories other than parallel or perpendicular to the lane in which the vehicle is traveling. By heightening powertrain responsiveness under these conditions, vehicle responsiveness for avoiding oncoming traffic can be achieved while conserving energy. FIG. 1 illustrates an example of a propulsion system for a vehicle comprising an engine, motor, generator, fuel system and control system. FIG. 2 illustrates an example of an internal combustion engine, although the systems and method disclosed can be applicable to compression ignition engines and turbines, or motorized electric vehicles without a combustion engine. FIG. 3 illustrates examples of vehicle presence sensors located on the periphery of a vehicle for detecting the presence of oncoming vehicles. FIG. 4 shows examples of typical energy-saving modes that can be operated in a vehicle. FIGS. 5 and 6 illustrate various example scenarios of oncoming traffic for a vehicle approaching a 4-way intersection and exiting a parking spot in a parking lot. FIG. 7 illustrates a flowchart describing an example method of exiting or inhibiting energy-saving modes of a vehicle responsive to conditions when oncoming vehicles are detected. FIG. 8 is a table listing different conditions under which oncoming vehicles may be detected.

Turning now to FIG. 1, it illustrates an example a vehicle propulsion system 100. Vehicle propulsion system 100 may comprise a fuel burning engine 110 and a motor 120. As a non-limiting example, engine 110 comprises an internal combustion engine and motor 120 comprises an electric motor. As such, vehicle propulsion system 100 may be a propulsion system for a hybrid-electric vehicle. However, vehicle propulsion system may also be a propulsion system for a non-hybrid vehicle, or an electric vehicle with an electric motor and no combustion engine. Motor 120 may be configured to utilize or consume a different energy source than engine 110.

For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV). In other examples, where the vehicle propulsion system 100 is for an electric vehicle, vehicle propulsion system may be referred to as an electric vehicle (EV).

Vehicle propulsion system 100 may utilize a variety of different operational modes depending on operating conditions encountered by the vehicle propulsion system. Some of these modes may enable engine 110 to be maintained in an off state (e.g. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150 such as a battery. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor. The vehicle propulsion system may be configured to transition between two or more of the operating modes described above depending on vehicle operating conditions. As another example, vehicle propulsion system may be a propulsion system for an electric vehicle (e.g., with no combustion engine), wherein an electric motor receiving electric power from energy storage device 150 (e.g., a battery) may propel the vehicle.

Fuel system 140 may include one or more fuel storage tanks 144 for storing fuel on-board the vehicle. For example, fuel tank 144 may store one or more liquid fuels, including but not limited to gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, an exhaust-gas grid heater, an exhaust-gas recycle cooler, etc. As a non-limiting example, energy storage device 150 may include one or more batteries and/or capacitors.

Control system 190 may communicate with one or more of engine 110, motor 120, fuel system 140, energy storage device 150, and generator 160. As will be described in FIG. 2, control system 190 may comprise controller 211 and may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. As a further non-limiting example, vehicle propulsion system 100 may be configured as a plug-in electric vehicle (EV), whereby electrical energy may be supplied to energy storage device 150 from power source 180 via an electrical energy transmission cable 182. Control system 190 may further control the output of energy or power from energy storage device 150 (e.g., a battery) depending on the electric load of vehicle propulsion system 100. For example, during reduced electrical load operation, control system 190 may step-down the voltage delivered from energy storage device 150, via a an inverter/converter, in order to save energy.

During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (state-of-charge).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it will be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion.

A plug-in hybrid electric vehicle, as described with reference to vehicle propulsion system 100, may be configured to utilize a secondary form of energy (e.g. electrical energy) that is periodically received from an energy source that is not otherwise part of the vehicle.

The vehicle propulsion system 100 may also include a message center 196, ambient temperature/humidity sensor 198, electrical load sensor 154, and a roll stability control sensor, such as a lateral and/or longitudinal and/or steering wheel position or yaw rate sensor(s) 199. The message center may include indicator light(s) and/or a text-based display in which messages are displayed to an operator, such as a message requesting an operator input to start the engine, as discussed below. The message center may also include various input portions for receiving an operator input, such as buttons, touch screens, voice input/recognition, GPS device, etc. In an alternative embodiment, the message center may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Referring now to FIG. 2, it illustrates a non-limiting example of a cylinder 200 of engine 110, including the intake and exhaust system components that interface with the cylinder. Note that cylinder 200 may correspond to one of a plurality of engine cylinders. Cylinder 200 is at least partially defined by combustion chamber walls 232 and piston 236. Piston 236 may be coupled to a crankshaft 240 via a connecting rod, along with other pistons of the engine. Crankshaft 240 may be operatively coupled with drive wheel 130, motor 120 or generator 160 via a transmission.

Cylinder 200 may receive intake air via an intake passage 242. Intake passage 242 may also communicate with other cylinders of engine 110. Intake passage 242 may include a throttle 262 including a throttle plate 264 that may be adjusted by control system 190 to vary the flow of intake air that is provided to the engine cylinders. Cylinder 200 can communicate with intake passage 242 via one or more intake valves 252. Cylinder 200 may exhaust products of combustion via an exhaust passage 248. Cylinder 200 can communicate with exhaust passage 248 via one or more exhaust valves 254.

In some embodiments, cylinder 200 may optionally include a spark plug 292, which may be actuated by an ignition system 288. A fuel injector 266 may be provided in the cylinder to deliver fuel directly thereto. However, in other embodiments, the fuel injector may be arranged within intake passage 242 upstream of intake valve 252. Fuel injector 266 may be actuated by a driver 268.

A non-limiting example of control system 190 is depicted schematically in FIG. 2. Control system 190 may include a processing subsystem (CPU) 202, which may include one or more processors. CPU 202 may communicate with memory, including one or more of read-only memory (ROM) 206, random-access memory (RAM) 208, and keep-alive memory (KAM) 210. As a non-limiting example, this memory may store instructions that are executable by the processing subsystem. The process flows, functionality, and methods described herein may be represented as instructions stored at the memory of the control system that may be executed by the processing subsystem.

CPU 202 can communicate with various sensors and actuators of engine 110, energy storage device 150, and fuel system 140 via an input/output device 204. As a non-limiting example, these sensors may provide sensory feedback in the form of operating condition information to the control system, and may include: an indication of mass airflow (MAF) through intake passage 242 via sensor 220, an indication of manifold air pressure (MAP) via sensor 222, an indication of throttle position (TP) via throttle 262, an indication of engine coolant temperature (ECT) via sensor 212 which may communicate with coolant passage 214, an indication of engine speed (PIP) via sensor 218, an indication of exhaust gas oxygen content (EGO) via exhaust gas composition sensor 226, an indication of intake valve position via sensor 255, an indication of exhaust valve position via sensor 257, an indication of electrical load via electrical load sensor 154, and an indication of oncoming traffic via one or more vehicle presence sensors 298, among others. For example, vehicle presence sensors 298 may include radar, laser, video, infrared, ultrasound, and image sensors, and/or combinations thereof to detect the presence of oncoming vehicles in the vicinity of the vehicle. Furthermore, an Oncoming Traffic Alert system for aiding vehicle responsiveness may comprise vehicle presence sensors 298. In particular, an Oncoming Traffic Alert type system may use information from vehicle presence sensors to determine the presence of oncoming traffic (e.g. oncoming parallel and perpendicular or cross-traffic), and to alert the driver (e.g., by sending visual and/or audio messages to message center 196) of oncoming traffic hazards. Electrical load sensor 154 may, as an example, be a current transformer that monitors the amount of current vehicle propulsion system 100 is drawing from the battery.

Furthermore, the control system 190 may control operation of the engine 110, including cylinder 200 via one or more of the following actuators: driver 268 to vary fuel injection timing and quantity, ignition system 288 to vary spark timing and energy, intake valve actuator 251 to vary intake valve timing, exhaust valve actuator 253 to vary exhaust valve timing, and throttle 262 to vary the position of throttle plate 264, among others. Note that intake and exhaust valve actuators 251 and 253 may include electromagnetic valve actuators (EVA) and/or cam-follower based actuators.

Turning now to FIG. 3, it illustrates a top-view of a vehicle showing example positions of vehicle presence sensors 298 located around the vehicle periphery. For example, vehicle 300 may have one or more sensors located in the vicinity of the front of the vehicle to detect oncoming traffic approaching the front or side of the vehicle. As a further example, vehicle 300 may have one or more sensors located in the vicinity of the rear of the vehicle to detect oncoming traffic approaching the rear or side of the vehicle. In this manner, oncoming traffic may be detected by vehicle presence sensors 298, whether the vehicle is moving forwards or in reverse. Furthermore, oncoming traffic is understood herein to also include both oncoming traffic wherein oncoming vehicles travel in lanes approximately parallel to the lane of the vehicle, as well as oncoming cross-traffic, wherein vehicles travel in lanes approximately perpendicular to or in lanes not parallel to the lane of the vehicle. Oncoming traffic may also include traffic approaching vehicle 300 from directions other than parallel or perpendicular to the direction that vehicle 300 is facing or moving. FIG. 3 illustrates example vehicle presence sensor positions, and is not meant to be limiting. As such, vehicle presence sensors may be located or installed at other locations in, on, or throughout the vehicle.

Turning now to FIG. 4, it illustrates a collection of example energy-saving modes 400 under which a vehicle may operate. In some examples, the energy-saving mode may comprise a fuel-efficiency (or fuel-saving) mode. For example, operating the vehicle in one or more energy-saving modes may consume less fuel overall or on average, while generating the same power output and/or performing a given maneuver, as compared to operating the vehicle in a standard operating mode (e.g., not an energy-saving mode). The starting and stopping of the energy-saving modes during vehicle operation may be controlled by control system 190 of the vehicle propulsion system, and may depend on the vehicle operating conditions and sensory information fed back to the control system. For example, a vehicle operating in Hybrid Electric mode 410 may switch to Electric-only drive during low load conditions, heavy traffic, and/or low speed travel with frequent stops. Reduced Idle rpm mode 420 may be activated by the control system 190 to operate the engine at reduced rpm to conserve fuel during frequent or extended periods of idling, such as at long traffic lights, or while the vehicle is standing. Furthermore, Auto Stop-Start mode 450 may stop the engine during long periods of idling to conserve fuel. Further still, an EV operating under a reduced electrical load 470 may step-down the DC voltage delivered by energy storage device 150, such as a battery, in order to save energy.

While parking, Park-Assist mode 430 may be started to efficiently guide the vehicle into a parking spot, while restricting vehicle speed and braking, and thereby conserve fuel. Variable Displacement Engine (VDE) mode 440 comprises deactivating one or more engine cylinders 200 during light-load vehicle operation to reduce fuel consumption. Cylinder deactivation can be achieved by closing intake and exhaust valves for one or more cylinders, and/or by ceasing delivery of fuel to those one or more cylinders. By deactivating one or more cylinders, variable displacement engines can maintain high cylinder pressures in the remaining active engine cylinders and thereby maintain high engine fuel consumption efficiency.

Emission Control System 460 may also restrict the operation of the vehicle powertrain systems, for example during periods of catalyst device regeneration, in order to conserve fuel and/or reduce emissions. For example, electric power may be used to preheat catalysts instead of post-injecting fuel during cold start-ups. In addition, the engine may be run at high rpm or during periods of low load to regenerate catalysts.

While operating in one or more of the energy-saving modes described above, a vehicle's powertrain systems may be constrained or restricted in order to save energy. As such, vehicle powertrain responsiveness and/or driver readiness to avoid oncoming traffic may be decreased. For example, if a hybrid vehicle is operating in electric-only mode, reduced engine rpm, engine off, or with deactivated cylinders, the vehicle may have a delayed response to accelerate the vehicle in performing an evasive maneuver to avoid an oncoming vehicle. As another example, if an electric vehicle is operating under reduced electrical load with stepped-down voltage of energy storage device 150, the vehicle may have a delayed response to accelerate the vehicle in performing an evasive maneuver to avoid an oncoming vehicle. As a further example, because the vehicle speed and braking are restricted while operating Park-Assist mode, the vehicle responsiveness to oncoming vehicles may be slow as compared to when Park-Assist mode is inactive. Accordingly, while the vehicle is operating in one or more energy-saving modes, vehicle responsiveness to the operator, the vehicle driveability, and ultimately the operator satisfaction may be diminished.

Turning now to FIG. 5, it illustrates example scenarios of oncoming traffic for a vehicle 510 approaching a 4-way intersection 500. Oncoming vehicles, for example vehicles 550 and 540, may be present and may approach vehicle 510 at the intersection traveling in the same lane 502 as vehicle 510, or in an adjacent lane 504 respectively. Furthermore, oncoming vehicles can also include cross-traffic, wherein oncoming vehicles are traveling in lanes not parallel to the lane in which the vehicle is traveling. For example, vehicles 520, 530, 560, and 570 may be approaching the intersection from either side of the vehicle in lanes 506 or 508 perpendicular to lane 502 in which vehicle 510 is traveling. Once at the intersection, vehicle 510 may proceed, as examples, forward through the intersection as indicated by arrow 516, make a right turn as indicated by arrow 518, or make a left turn as indicated by arrow 514.

As mentioned above, vehicle 510 may be equipped with one or more vehicle presence sensors 298 positioned about the periphery of the vehicle for detecting the presence of oncoming vehicles. Vehicle presence sensors 298 may be especially useful for detecting oncoming vehicles that are unseen by the vehicle driver, including vehicles driving in the driver's blind spots. Vehicle presence sensors 298 may include radar, laser, video, infrared, ultrasound, and image sensors, and/or combinations thereof to detect the presence of oncoming vehicles in the vicinity of the vehicle. As such vehicle presence sensors 298 may be able to determine the distance of oncoming vehicles, the number of oncoming vehicles, the direction of oncoming vehicles, and the like. Furthermore, the vehicle presence sensors 298 may acquire information regarding oncoming vehicles and communicate that information to the control system 190 at regular intervals. Accordingly, using information from vehicle presence sensors 298 along with information gathered from other vehicle sensors, control system 190 may be able to determine the speed and trajectory at which oncoming vehicles are approaching. Control system 190 may then to evaluate if the oncoming vehicles will reach a certain predetermined threshold distance from the vehicle within a predetermined threshold time, $t_{TH}$, and the like. For example, vehicle 550 may be approaching vehicle 510 in the same lane. However, if vehicle 550 is very far away (e.g., greater than a first threshold distance) and/or traveling very slowly, then vehicle 550 may not be determined to be an oncoming vehicle of concern, and the vehicle may selectively remain in energy-saving mode. On the other hand if vehicle 550 is traveling within a first threshold distance from vehicle 510, vehicle 510 may in response, discontinue operation of energy-saving mode.

The relative trajectories and lanes of travel of vehicle 510 and oncoming vehicles may also influence the response of vehicle 510 to oncoming traffic. For example, using vehicle presence sensor information, the control system may determine that oncoming vehicles 540 and 560, despite approaching at high speeds, are not of concern to vehicle 510, because it is turning right at intersection 500 and following path 518 (e.g., as may be determined by the steering wheel position and yaw rate sensors 199, GPS route information, and the like). In such a scenario, the distances of oncoming vehicles 540 and 560 may be greater than a certain threshold distance, and the control system 190 may selectively continue to operate vehicle 510 in one or more energy-saving modes. On the other hand, if vehicle presence sensors 298 detect the presence of oncoming vehicle 506, which is traveling in the same lane 506 as the vehicle is making its right-hand turn at intersection 500, oncoming vehicle 506 may be traveling within a certain threshold distance from vehicle 510, and control system 190 may exit one or more energy-saving modes 400 so that the vehicle 510 can readily respond to avoid oncoming traffic.

However if the distance of oncoming vehicle 506 from vehicle 510 is determined to be larger than a first threshold distance, the oncoming vehicle 506 may be passing traffic and may not be an imminent hazard. In this case, control system 190 may selectively maintain vehicle operation in energy-saving mode, thereby preventing excessive interruption and restarts of the energy-saving mode. In contrast, in the case where vehicle presence sensors 298 detect an oncoming vehicle 550 in the same lane 502 as vehicle 510 within a certain threshold distance, exiting one or more of the energy-saving modes 400 may potentially improve the responsiveness of vehicle 510 for avoiding the oncoming vehicle as compared to if the vehicle 510 continued to operate in one or more energy-saving modes. In this manner, the vehicle may respond differently to oncoming vehicles in the same lane as the vehicle as compared to oncoming vehicles in an adjacent lane. Further, the projected path (e.g., turning left 514, proceeding straight 516, turning right 518) of the vehicle may also influence whether oncoming vehicles are detected as approaching in the same or adjacent lanes. Further still, the distance, and speed and time to reach a threshold distance from vehicle 510 of an oncoming vehicle may influence the actions taken by control system 190 to selectively continue to operate vehicle 510 in an energy-saving mode or to exit the energy-saving mode, responsive to the detected presence of oncoming vehicles.

Next, as a further example, the vehicle 510 may proceed straight through intersection 500. Vehicle presence sensors 298 may detect oncoming vehicle 540. Information from vehicle presence sensors 298 may indicate that oncoming vehicle 540 is approaching in an adjacent lane. As such, control system 190 may selectively maintain operation of the vehicle in an energy-saving mode. However in another example, if the distance of oncoming vehicle 540 from vehicle 510 is within a certain threshold distance, the vehicle may exit energy-saving mode so that vehicle 510 can be responsive for example, in the case of oncoming vehicle 540 turning left at the intersection.

Vehicle presence sensors 298 may also detect the presence of oncoming vehicles from cross-traffic (e.g., vehicles 520, 530, 560, and 570) within a threshold distance. In this case, the vehicle may exit energy-saving mode regardless of the lanes 506 and 508 in which the oncoming vehicles are approaching, or the path of vehicle 510 (e.g., 514, 516, or 518), in response to oncoming traffic thereby potentially improving responsiveness of vehicle 510 for avoiding the oncoming traffic. Alternatively, vehicle 510 may selectively continue to operate in energy-saving mode if the oncoming vehicles 520, 530, 560 or 570 are detected outside of a threshold distance from vehicle 510.

Turning now to FIG. 6, it illustrates example scenarios of oncoming traffic for a vehicle 610 leaving a parking spot in a parking lot 600. Vehicle 610 may be reversing out of a parking spot or may be traveling in a forward direction, and may have vehicle presence sensors 298 to detect oncoming traffic. Oncoming traffic may include approaching cross-traffic, for example as represented by vehicles 620, 630, 640, and 650 in lanes 602 and 604, and oncoming parallel traffic, for example as represented by vehicle 660 leaving a parking spot directly opposite the parking spot of vehicle 610 in lane 606. Oncoming traffic can include vehicles approaching from other directions in addition to those illustrated in FIG. 6, for example in parking lots where the parking spaces are arranged diagonally, or when parallel parking. Other parked vehicles 680 may be detected by vehicle presence sensors 298. However vehicle presence sensors 298 may determine that parked vehicles 680 are not moving and thus may have no influence on the operation of vehicle 610.

If oncoming vehicles 620, 630, 640, or 650 are detected by vehicle presence sensors 298 within a certain threshold distance, the vehicle may exit energy-saving mode (e.g., Park-Assist mode) so that the vehicle operator can readily respond to the oncoming vehicles. In addition, if the vehicle presence sensors detect the approach of vehicle 660 within a threshold distance, the vehicle energy-saving mode may be exited. Utilizing the vehicle presence sensors 298 and responsively exiting or maintaining energy-saving mode can be advantageous when oncoming vehicles are unseen or are in the blind spot of the vehicle driver. In this manner, a driver of a vehicle exiting a parking spot may alerted to and may readily respond to oncoming traffic, even when oncoming traffic is initially unseen by the driver.

As a further example scenario, an energy-saving mode, for example a park-assist mode, may be active when a vehicle is parking. Oncoming vehicles may present hazards and may be detected while the vehicle is parking. For example, another vehicle may not see the operator's vehicle and may attempt to park in the same parking spot simultaneously. In addition, oncoming vehicles may collide with the parking vehicle. Under these circumstances, if vehicle presence sensors detect an oncoming vehicle while parking, the energy-saving park-assist mode would be exited, allowing the operator to readily respond to avoid the oncoming vehicle.

FIGS. 5 and 6 thus illustrate some example scenarios of oncoming traffic configurations for a vehicle 510 approaching a 4-way intersection and leaving a parking spot in a vehicle parking lot. The scenarios and responses to oncoming traffic of vehicle 510 described above are not exhaustive scenarios. Other scenarios for responding to oncoming traffic at 4-way intersections and parking lots exist. The above-mentioned scenarios serve only to illustrate examples of how the advantages over conventional technologies using the present invention can be achieved. Furthermore the methods and systems herein can also be applied to other oncoming traffic scenarios involving vehicle 510, such as 3-way intersections, 2-way or multi-way traffic or one-way traffic, and the like.

As such, a vehicle system may comprise an engine, one or more vehicle presence sensors to detect the presence of an oncoming vehicle, and an engine control unit that receives input from the one or more vehicle presence sensors. The engine control unit may comprise non-transitory instructions executable to operate a vehicle in an energy-saving mode, the non-transitory instructions comprising selectively remaining in the energy-saving mode in response to an indication of an absence of an oncoming vehicle to maintain fuel economy, and inhibiting entry into, or exiting, the energy-saving mode in response to an indication of the presence of the oncoming vehicle to maintain vehicle responsiveness to oncoming traffic. The vehicle may also be traveling at a speed greater than a threshold speed. Selectively remaining in the energy-saving mode may be in response to the indication of the absence of the oncoming vehicle traveling in a same lane as the vehicle, and inhibiting entry into, or exiting, the energy-saving mode may be in response to the indication of the presence of the oncoming vehicle traveling in the same lane as the vehicle. Selectively remaining in the energy-saving mode may further be in response to the indication of the absence of the oncoming vehicle traveling in a lane adjacent to the vehicle, and inhibiting entry into, or exiting, the energy-saving mode may further be in response to the indication of the presence of the oncoming vehicle traveling in the lane adjacent to the vehicle.

Turning now to FIG. 7, it illustrates an example method 700 of improving powertrain responsiveness in a vehicle by selectively remaining in energy-saving mode or exiting energy-saving modes in response to the absence or presence of oncoming traffic. Method 700 begins at step 710 where the vehicle operating conditions are determined such as engine speed, torque, operating mode, energy-saving mode, and the like. In addition, sensor data such as vehicle presence sensor 298 data may be obtained along with other vehicle information such as yaw rate sensor data 199, GPS data, pedal position 192, steering wheel position, and the like. Next, method 700 continues at step 720, where it is determined if the vehicle is moving at a speed greater than a threshold speed. If the vehicle is stopped or traveling slower than the threshold speed, then the Oncoming Traffic Alert system is switched off at step 730, and method 700 ends. Exiting the Oncoming Traffic Alert system may comprise deactivating or temporarily suspending signals communicated from vehicle presence sensors 298. The threshold speed may be a preset or predetermined speed. If the vehicle is stopped or traveling slower than the threshold speed, the likelihood of oncoming traffic may be very small as compared to when the vehicle is traveling faster than the threshold speed. Under these conditions, the vehicle energy-saving modes may not be interrupted by the Oncoming Traffic Alert system, in order to conserve fuel. In some examples, the threshold speed may be set to zero, for example, when the vehicle is stopped or parked.

If the vehicle is traveling faster than the threshold speed, method 700 continues at step 740, where the presence of oncoming vehicles is determined. The presence of oncoming vehicles may be determined using information communicated from vehicle presence sensors 298. FIG. 8 illustrates a few example scenarios when oncoming vehicles may be detected. For example, there may be no oncoming vehicles detected when oncoming traffic may comprise one or more oncoming vehicles approaching the vehicle, but at a distance greater than a first threshold distance, $d_{TH1}$. When oncoming vehicles are detected, but are a distance greater than $d_{TH1}$ from the vehicle, they may be considered as passing traffic, and may not present any danger to the vehicle. Under these conditions, the vehicle may selectively maintain operation in one or more energy-saving modes.

Continuing with FIG. 8, oncoming traffic may further comprise one or more oncoming vehicles approaching the vehicle in the same lane. As such, in response to detection of an oncoming vehicle in the same lane, the vehicle may exit energy-saving mode when the oncoming vehicle is within a second threshold distance, $d_{TH2}$. The second threshold distance, $d_{TH2}$, may be less than the first threshold distance, $d_{TH1}$. As a further example, the vehicle may exit energy-saving mode when the oncoming vehicle in the same lane will be within $d_{TH2}$ of the vehicle after a threshold time, $t_{TH}$. Threshold time, $t_{TH}$, may be determined by vehicle presence sensors 298 by the trajectory and speed of the oncoming vehicle, as described above. In this manner, the vehicle can readily respond to oncoming vehicles that are greater than the second threshold distance, $d_{TH2}$, from the vehicle, but traveling at high speeds such that they will be within $d_{TH2}$ within the threshold time $t_{TH}$.

In another example, oncoming traffic may comprise an oncoming vehicle in an adjacent lane of traffic. In this case, the vehicle may responsively exit energy-saving mode when the oncoming vehicle in the adjacent lane is within a third threshold distance, $d_{TH3}$, which may be less than the second threshold distance, from the vehicle. Because the vehicle is traveling in an adjacent lane, the vehicle may remain in energy-saving mode until the oncoming vehicle is within a smaller threshold distance, $d_{TH3}$, from the vehicle as compared to the case when the oncoming vehicle is traveling in the same lane as the vehicle, in order to conserve fuel.

As a further example, oncoming traffic can comprise cross-traffic approaching the vehicle from any lane. As described above, cross-traffic may approach the vehicle from lanes in directions perpendicular to the lane of the vehicle or from lanes in directions other than parallel or perpendicular to the lane of the vehicle. If the oncoming cross-traffic is within a fourth threshold distance, $d_{TH4}$, then the vehicle may responsively exit energy-saving mode. The fourth threshold distance, $d_{TH4}$, may be greater than $d_{TH3}$, but less than $d_{TH2}$. In this manner, the vehicle may respond readily to oncoming cross-traffic, whose associated risk or hazards relative to the vehicle may be greater than oncoming parallel traffic in an adjacent lane, but less than the associated risk or hazards associated with oncoming parallel traffic approaching in the same lane as the vehicle. Under certain conditions, the vehicle response to cross-traffic may be modified based on the trajectory of the vehicle. For example, as described above, if the vehicle is turning right at an intersection, cross-traffic in lanes adjacent to the lane into which the vehicle is turning may not trigger the vehicle exiting from energy-saving mode.

In this way, the example scenarios from FIG. 8 illustrate how fuel conservation and operation of energy-saving modes can be balanced with vehicle responsiveness to varying types of oncoming traffic, in order to maintain driveability of the vehicle and operator satisfaction. The example scenarios in FIG. 8 are not exhaustive scenarios, and many other scenarios exist. For example there may be conditions where the vehicle trajectory relative to oncoming traffic may be considered, as described above. Furthermore, other conditions including the speed, and amount of oncoming traffic may also influence the vehicle response. For example, if oncoming traffic comprises both oncoming parallel and oncoming cross-traffic, then in response to the increased risk as compared to when there is only one oncoming vehicle, the vehicle may respond by exiting energy-saving mode in a more conservative manner (e.g. exiting energy-saving mode earlier or when oncoming vehicles are a greater distance away).

Returning to FIG. 7 at step 740, if the presence of an oncoming vehicle is not detected, for example using the scenarios illustrated in FIG. 8, then the method 700 continues at step 750, where the vehicle selectively maintains or does not inhibit energy-saving mode responsive to a lack of oncoming vehicles. After executing step 750, method 700 continues at step 790.

If an oncoming vehicle is detected at 740, then method 700 continues to step 760 where it determines if an energy-saving mode is inactive. If an energy-saving mode is active, then step 700 continues at 770 where the energy-saving mode is exited or stopped responsive to the oncoming vehicle. Method 700 then continues at step 780. If energy-saving mode is inactive, method 700 inhibits entry into energy-saving mode responsive to the presence of the oncoming vehicle at step 780.

Method 700 continues at step 790 where feedback is provided to the operator describing actions taken by the method in response to the presence or absence of oncoming vehicles. The feedback may be presented to the operator at the message center 196 in various forms, such as through audible sounds and/or visual light indicators. Following step 790, step 700 ends.

In this manner, a method for operating a vehicle may comprise operating the vehicle in an energy-saving mode, selectively remaining in the energy-saving mode in response to an indication of an absence of an oncoming vehicle to conserve energy, and inhibiting entry into, or exiting, the energy-saving mode in response to an indication of a presence of the oncoming vehicle to maintain vehicle responsiveness to oncoming traffic. Furthermore, the vehicle may be traveling at a speed greater than a threshold speed. Further still, selectively remaining in the energy-saving mode may be in response to the indication of the absence of the oncoming vehicle, wherein the oncoming vehicle comprises an oncoming vehicle traveling in a same lane as the vehicle, and wherein inhibiting entry into, or exiting, the energy-saving mode is in response to the indication of the presence of the oncoming vehicle traveling in the same lane as the vehicle. In addition, selectively remaining in the energy-saving mode may further be in response to the indication of the absence of the oncoming vehicle, wherein the oncoming vehicle comprises an oncoming vehicle traveling in a lane adjacent to the vehicle, and wherein inhibiting entry into, or exiting, the energy-saving mode may further be in response to the indication of the presence of the oncoming vehicle traveling in the lane adjacent to the vehicle.

The method can further comprise sending a message to notify a driver of the vehicle of selectively remaining in the energy-saving mode or inhibiting entry into, or exiting, the energy-saving mode.

The energy-saving mode may comprise activating at least one of a stop-start system, a lowered engine idling system of the vehicle, a variable displacement engine system, a park-assist system, an emissions control system of the vehicle, or an electric-only mode of a hybrid electric vehicle. The energy-saving mode may further comprise stepping down the voltage of an energy storage device supplying electrical power to propel an electric vehicle operating under reduced electrical load. The energy-saving mode may further comprise a vehicle system that modifies operation of a powertrain system during vehicle operation to conserve fuel.

A method for operating a vehicle may also comprise operating the vehicle in an energy-saving mode, selectively remaining in the energy-saving mode in response to an indication of an absence of an oncoming vehicle to maintain fuel economy, and inhibiting entry into, or exiting, the energy-saving mode in response to an indication of a presence of the oncoming vehicle to maintain vehicle responsiveness to oncoming traffic, wherein the presence of the oncoming vehicle comprises the oncoming vehicle traveling within a first threshold distance from the vehicle. Furthermore, the vehicle may be traveling at a speed greater than a threshold speed.

Selectively remaining in the energy-saving mode may be in response to the indication of the absence of the oncoming vehicle, wherein the oncoming vehicle comprises an oncoming vehicle traveling in a same lane as the vehicle, and inhibiting entry into, or exiting, the energy-saving mode may be in response to the indication of the presence of the oncoming vehicle traveling in the same lane as the vehicle. The presence of the oncoming vehicle traveling in the same lane as the vehicle may further comprise the oncoming vehicle traveling in the same lane as the vehicle within a second threshold distance less than the first threshold distance from the vehicle, or the oncoming vehicle traveling in the same lane as the vehicle reaching the second threshold distance from the vehicle after a threshold time.

Selectively remaining in the energy-saving mode may further be in response to the indication of the absence of the oncoming vehicle, wherein the oncoming vehicle comprises an oncoming vehicle traveling in a lane adjacent to the vehicle, and inhibiting entry into, or exiting, the energy-saving mode may be in response to the indication of the presence of the oncoming vehicle traveling in the lane adjacent to the vehicle. The presence of the oncoming vehicle traveling in the lane adjacent to the vehicle further may comprise the oncoming vehicle traveling in the lane adjacent to the vehicle within a third threshold distance less than the second threshold distance from the vehicle.

The oncoming vehicle may further comprise an oncoming vehicle traveling in a lane not parallel to a lane in which the vehicle is traveling, within a fourth threshold distance of the vehicle, the fourth threshold distance less than the third threshold distance but greater than the second threshold distance.

Note that the example process flows described herein can be used with various engine and/or vehicle system configurations. The process flows described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily called for to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-8, V-10, V-12, opposed 4, and other engine types. The subject matter of the present disclosure includes all novel and non-obvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims are to be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method for operating a vehicle, comprising:
operating the vehicle in an energy-saving mode;

selectively remaining in the energy-saving mode in response to an indication of an absence of an oncoming vehicle to maintain fuel economy; and inhibiting entry into, or exiting, the energy-saving mode in response to an indication of a presence of the oncoming vehicle to maintain vehicle responsiveness to oncoming traffic.

2. The method of claim 1, wherein the vehicle is traveling at a speed greater than a threshold speed.

3. The method of claim 2, wherein selectively remaining in the energy-saving mode is in response to the indication of the absence of the oncoming vehicle, wherein the oncoming vehicle comprises an oncoming vehicle traveling in a same lane as the vehicle, and wherein inhibiting entry into, or exiting, the energy-saving mode is in response to the indication of the presence of the oncoming vehicle traveling in the same lane as the vehicle.

4. The method of claim 2, wherein selectively remaining in the energy-saving mode is in response to the indication of the absence of the oncoming vehicle, wherein the oncoming vehicle comprises an oncoming vehicle traveling in a lane adjacent to the vehicle, and wherein inhibiting entry into, or exiting, the energy-saving mode is in response to the indication of the presence of the oncoming vehicle traveling in the lane adjacent to the vehicle.

5. The method of claim 4, further comprising sending a message to notify a driver of the vehicle of selectively remaining in the energy-saving mode or inhibiting entry into, or exiting, the energy-saving mode.

6. The method of claim 5, wherein the energy-saving mode comprises activating at least one of a stop-start system, or a lowered engine idling system of the vehicle.

7. The method of claim 5, wherein the energy-saving mode comprises activating at least one of a variable displacement engine system, a park-assist system, or an emissions control system of the vehicle.

8. The method of claim 5, wherein the energy-saving mode comprises at least one of activating an electric-only mode of a hybrid electric vehicle, or stepping down a voltage supplied to a motor of an electric vehicle from an energy storage device while operating under a reduced electrical load.

9. The method of claim 5, wherein the energy-saving mode comprises a vehicle system that modifies operation of a powertrain system during vehicle operation to conserve fuel.

10. A method for operating a vehicle, comprising:
operating the vehicle in an energy-saving mode;
selectively remaining in the energy-saving mode in response to an indication of an absence of an oncoming vehicle to maintain fuel economy; and
inhibiting entry into, or exiting, the energy-saving mode in response to an indication of a presence of the oncoming vehicle to maintain vehicle responsiveness to oncoming traffic, wherein the presence of the oncoming vehicle comprises the oncoming vehicle traveling within a first threshold distance from the vehicle.

11. The method of claim 10, wherein the vehicle is traveling at a speed greater than a threshold speed.

12. The method of claim 11, wherein selectively remaining in the energy-saving mode is in response to the indication of the absence of the oncoming vehicle, wherein the oncoming vehicle comprises an oncoming vehicle traveling in a same lane as the vehicle, and wherein inhibiting entry into, or exiting, the energy-saving mode is in response to the indication of the presence of the oncoming vehicle traveling in the same lane as the vehicle.

13. The method of claim 12, wherein the presence of the oncoming vehicle traveling in the same lane as the vehicle further comprises the oncoming vehicle traveling in the same lane as the vehicle within a second threshold distance less than the first threshold distance from the vehicle, or the oncoming vehicle traveling in the same lane as the vehicle reaching the second threshold distance from the vehicle after a threshold time.

14. The method of claim 13, further comprising selectively remaining in the energy-saving mode in response to the indication of the absence of the oncoming vehicle, wherein the oncoming vehicle comprises an oncoming vehicle traveling in a lane adjacent to the vehicle, and wherein inhibiting entry into, or exiting, the energy-saving mode is in response to the indication of the presence of the oncoming vehicle traveling in the lane adjacent to the vehicle.

15. The method of claim 14, wherein the indication of the presence of the oncoming vehicle traveling in the lane adjacent to the vehicle further comprises the oncoming vehicle traveling in the lane adjacent to the vehicle within a third threshold distance less than the second threshold distance from the vehicle.

16. The method of claim 15, wherein the oncoming vehicle further comprises an oncoming vehicle traveling in a lane not parallel to a lane in which the vehicle is traveling, within a fourth threshold distance of the vehicle, the fourth threshold distance less than the third threshold distance but greater than the second threshold distance.

17. A vehicle system, comprising:
an engine;
one or more vehicle presence sensors to detect a presence of an oncoming vehicle; and
an engine control unit that receives input from the one or more vehicle presence sensors, the engine control unit comprising non-transitory instructions executable to operate a vehicle in an energy-saving mode, the non-transitory instructions comprising:
selectively remaining in the energy-saving mode in response to an indication of an absence of an oncoming vehicle to maintain fuel economy; and
inhibiting entry into, or exiting, the energy-saving mode in response to an indication of the presence of the oncoming vehicle to maintain vehicle responsiveness to oncoming traffic.

18. The vehicle system of claim 17, wherein the vehicle is traveling at a speed greater than a threshold speed.

19. The vehicle system of claim 18, wherein selectively remaining in the energy-saving mode is in response to the indication of the absence of the oncoming vehicle traveling in a same lane as the vehicle, and wherein inhibiting entry into, or exiting, the energy-saving mode is in response to the indication of the presence of the oncoming vehicle traveling in the same lane as the vehicle.

20. The vehicle system of claim 18, wherein selectively remaining in the energy-saving mode is in response to the indication of the absence of the oncoming vehicle traveling in a lane adjacent to the vehicle, and wherein inhibiting entry into, or exiting, the energy-saving mode is in response to the indication of the presence of the oncoming vehicle traveling in the lane adjacent to the vehicle.

* * * * *